United States Patent [19]

Schirmann et al.

[11] 4,110,288

[45] Aug. 29, 1978

[54] AQUEOUS VINYL POLYMERIC EMULSION SYSTEM AND PROCESS OF PREPARING THE SAME USING AMINOPLAST RESIN

[75] Inventors: Peter Jude Schirmann, Fairfield; Werner Josef Blank, Wilton, both of Conn.

[73] Assignee: American Cyanamid Company, Stamford, Conn.

[21] Appl. No.: 719,879

[22] Filed: Sep. 1, 1976

[51] Int. Cl.$^2$ .................. C08L 61/22; C08L 61/24; C08L 61/28; C08L 61/32

[52] U.S. Cl. .................. 260/29.4 UA; 260/29.6 NR; 260/856; 260/851

[58] Field of Search .................. 260/856 (U.S. only), 260/29.4 UA, 29.6 NR

[56] References Cited

U.S. PATENT DOCUMENTS

| | | | |
|---|---|---|---|
| 2,694,687 | 11/1954 | deBenneville | 260/29.4 UA |
| 3,352,838 | 11/1967 | Toepfl et al. | 260/856 |
| 3,365,414 | 1/1968 | Fisk et al. | 260/856 |
| 3,544,491 | 12/1970 | Benischeck et al. | 260/856 |
| 3,666,521 | 5/1972 | Weyna et al. | 260/29.6 TA |
| 3,714,078 | 1/1973 | Gordon et al. | 260/29.4 UA |
| 3,909,479 | 9/1975 | Wright et al. | 260/856 |
| 3,931,086 | 1/1976 | Lindemann | 260/29.4 UA |

OTHER PUBLICATIONS

Kirk–Othmer, "Encyclopedia of Chemical Technology," 2nd Ed., 1964, v. 2, pp. 253–254.

*Primary Examiner*—Howard E. Schain
*Attorney, Agent, or Firm*—James T. Dunn; John L. Sullivan

[57] ABSTRACT

An aqueous vinyl polymeric emulsion system prepared by polymerizing at least one polymerizable vinyl monomer in an aqueous emulsion system in the presence of an emulsifying agent, a polymerization catalyst and from about 0.1% to about 5%, by weight, based on the total weight of the monomer solids being polymerized, of a non-copolymerizable aminoplast resin.

14 Claims, No Drawings

AQUEOUS VINYL POLYMERIC EMULSION SYSTEM AND PROCESS OF PREPARING THE SAME USING AMINOPLAST RESIN

BACKGROUND OF THE INVENTION

Vinyl monomers have been polymerized in aqueous emulsion systems for a plurality of years in which one or more normally liquid vinyl monomers are introduced into an aqueous medium and the system is emulsified by use of an emulsifying agent and by use of a polymerization catalyst or polymerization catalyst system the vinyl monomers are polymerized to produce such a polymeric emulsion system. These vinyl polymer emulsion systems are frequently used as coating compositions which produce a high quality finish for automobile and truck bodies and also can be utilized for appliances such as refrigerators and stoves and for cabinets and the like. These emulsions can also be used to coat fabrics and will provide a product with good hand, light-fastness, abrasion resistance and dry-clean characteristics. Certain of these vinyl emulsion polymer systems can be used as adhesives to bond together paper, wood, plastic sheet and the like. When they are used to coat substrates made of metal, which coatings are to be baked, there is generally incorporated into the aqueous vinyl polymer emulsion system a cross-linking agent which is generally an aminoplast cross-linking agent so as to react with reactive groups or functional groups pendant from the vinyl polymer system. Upon baking, the thermoplastic vinyl polymer becomes crosslinked with the cross-linking agent and is converted upon baking to the thermoset state.

FIELD OF THE INVENTION

This invention is in the field of aqueous vinyl polymer emulsion systems that are prepared by polymerizing one or more vinyl monomers and, more particularly, acrylic monomers in an aqueous emulsion system using conventional emulsifying agents or surfactants and a polymerization catalyst system so as to produce polymeric materials that have utility particularly in the field of coating resins. These vinyl polymer emulsion systems can be used as trade sales paints which are utilized to coat substrates made of wood such as houses and the like and these trade sales paints are frequently referred to as house paints. When these vinyl polymer emulsion systems are used for this purpose, they are generally permitted to air dry and are not baked and, therefore, do not require the presence of an aminoplast cross-linking agent. However, when these aqueous vinyl polymer emulsion systems are to be used to coat metal substrates, such as automobile bodies, refrigerators, stoves and the like, they are generally combined with an aminoplast cross-linking agent in selected amounts and upon the deposition of the film, in the selected thickness, on such a metal substrate the film is baked for a period of time and at an elevated temperature sufficient to crosslink the vinyl polymer with the cross-linking agent.

DESCRIPTION OF THE PRIOR ART

The instant Applicants are aware of the following U.S. patents which represent prior art in the area of aqueous vinyl polymer emulsion systems: U.S. Pat. Nos. 2,819,237; 2,922,732; 3,352,838; 3,666,521; 3,714,078 and 3,821,145. Each of these U.S. patents is incorporated herein by reference. None of these references are deemed to be anticipatory of the concept of the present application but are the closest references of which the instant Applicants are aware.

SUMMARY OF THE INVENTION

This invention relates to an aqueous vinyl polymer emulsion system and to the process of preparing the same. The process comprises polymerizing at least one polymerizable vinyl monomer in an aqueous emulsion system in the presence of conventional amounts of conventional emulsifying agents and conventional amounts of a polymerization catalyst or catalyst system and in the presence of from 0.1% to about 5%, by weight, of an aminoplast cross-linking agent wherein said percentages, by weight, are based on the total weight of the monomer being polymerized. These aqueous vinyl and, more particularly, acrylic emulsion systems are useful for the production of coatings which coatings have hardness, flexibility, stability, low viscosity, skin resistance, blister and mudcrack resistance and are useful in coil, textile, wood, general purpose, and trade sales coatings. This invention permits the formulations of emulsions containing up to about 60% solids which show excellent oven stability and skin resistance and as coatings show resistance to blistering and mudcracking while exhibiting excellent mechanical properties.

The essence of the present invention resides in carrying out this polymerization process of one or more polymerizable vinyl monomers in an aqueous emulsion system in the presence of small quantities, namely, from about 0.1% to about 5%, by weight, of an aminoplast cross-linking agent. The polymerizable vinyl monomers that can be used in the process of the present invention may be either gaseous, normally liquid or solid. Combinations of these three physical forms of the polymerizable monomers may obviously be used. If a gaseous polymerizable monomer is to be used such as ethylene, propylene and the like, superatmospheric pressure may need to be exerted on the system. The preferred polymerizable monomers used in the process of the present invention are those that are nomally liquid. There are a plurality of alternative methods of carrying out this basic process which alternatives are merely variations on a theme and are not variations in the basic process itself. These alternative methods are set forth briefly hereinbelow but will be described in greater detail in the examples.

Method A is carried out by introducing the water, the surfactant and the cross-linking agent into the reaction vessel and then adding the vinyl monomer or monomer blend in increments over a period of time while heating the reaction mass.

Method B is like Method A except that the monomer blend is introduced into the reaction vessel from one dropping funnel and the catalyst solution is introduced into the reaction mass from a different dropping funnel. The water, surfactant and cross-linking agent had already been introduced into the reaction vessel before the addition of the catalyst solution and the monomer blend.

Method C covers the introduction of the water and surfactant into the reaction vessel followed by the addition of the monomer blend and the aminoplast cross-linking agent from a dropping funnel; followed by the polymerization of the monomers in the blend.

Method D is similar to Method A except that the aminoplast cross-linking agent in the aqueous dispersion is heated until the mixture becomes clear due to the hydrolysis of the amino resin. The pH is then adjusted to about 9–10 in order to halt the hydrolysis and preserve the clear solution, whereupon the monomer mix is introduced in increments from a dropping funnel.

Method E is similar to Method D except that the heating of the aminoplast cross-linking agent in the aqueous dispersion is continued beyond the point where the amino resin hydrolyzes, becomes clear and thereafter continued heating causes the aminoplast dispersion to become milky white, presumably due to the self-condensation of the aminoplast cross-linking agent. Thereupon, the pH is adjusted to 9–10 in order to prevent further reaction of the cross-linking agent with itself and at this point the monomer mix is introduced into the reaction vessel through the dropping funnel and the polymerization is thereafter carried out.

The heating time of these polymerization reactions varies between about 15 minutes and about 2 hours with the temperature varying between about 80° C. and 100° C. Heating time generally varies inversely with temperature.

Among the vinyl monomers that may be used in the preparation of the aqueous vinyl polymer emulsion systems of the present invention are vinyl acetate, styrene, o-, m-, p-alkyl styrenes such as the o-, m-, or p-methyl, ethyl, propyl and butyl styrenes, 2,4-dimethyl styrene, 2,3-dimethyl styrene, 2,5-dimethyl styrene, vinyl naphthalene, methyl vinyl ether, n-butyl vinyl ether, phenyl vinyl ether, acrylonitrile, halo ring or side chain styrenes such as alpha-chloro styrene, o-, m-, or p-chloro styrene, 2,4-dichloro styrene, 2,3-dichloro styrene, 2,5-dichloro styrene or the alkyl side chain styrenes such as the alpha-methyl styrene and the like.

Many of these vinyl monomers are identified more specifically as acrylic monomers inasmuch as they are in the acrylic acid or acrylic ester family. One can prepare these acrylic polymers by polymerizing a plurality of acrylic monomers such as the acrylates, including the methyl acrylate, ethyl acrylate, propyl acrylate, butyl acrylate, 2-ethyl hexyl acrylate, octyl acrylate, decyl acrylate, lauryl acrylate, methyl methacrylate, ethyl methacrylate, butyl methacrylate, heptyl methacrylate, decyl methacrylate, propyl crotonate, butyl crotonate, nonyl crotonate and the like.

One can also utilize these polymerizable monomers that contain reactive carboxylic groups such as the $\alpha,\beta$-ethylenically unsaturated monocarboxylic acids and the $\alpha,\beta$-ethylenically unsaturated dicarboxylic acids such as acrylic acid, methacrylic acid, crotonic acid, cinnamic acid, $\beta$-benzoyl acrylic acid. Included in the polycarboxylic acids of the $\alpha,\beta$-ethylenically unsaturated class are maleic acid, fumaric acid, itaconic acid, mesaconic, aconitic and the halogenated acids such as the halogenated maleic acid and, more specifically, chloromaleic acid and the like.

One can prepare these aqueous vinyl polymer emulsion systems by polymerizing a polymerizable acrylic monomer containing a reactive alcoholic hydroxy group. One may use such polymerizable momoners as the hydroxy alkyl esters of the $\alpha,\beta$-ethylenically unsaturated carboxylic acids such as the hydroxy alkyl esters of acrylic acid, methacrylic acid, maleic acid, fumaric acid, ethacrylic acid and the chloro as well as other halo substituted acrylic acids. These esters may either have a primary or a secondary hydroxyl group. Illustrative of the types of compounds that can be used to make the polymers of the present invention which contain the reactive alcoholic hydroxy groups are 2-hydroxy ethyl acrylate, 2-hydroxy propyl acrylate, 3-hydroxy propyl acrylate, 2-hydroxy butyl acrylate, 3-hydroxy butyl acrylate, 4-hydroxy butyl acrylate, 8-hydroxy octyl acrylate, 2-hydroxy ethyl methacrylate, 5-hydroxy hexyl methacrylate, 6-hydroxy octyl methacrylate, 8-hydroxy octyl methacrylate, 10-hydroxy decyl methacrylate, 3-hydroxy propyl crotonate, 4-hydroxy amyl crotonate, 5-hydroxy amyl crotonate, 6-hydroxy hexyl crotonate, 7-hydroxyl heptyl crotonate, 10-hydroxy decyl crotonate and the like. These hydroxy esters may be used either singularly or in combination with one another and with the polymerizable vinyl monomers devoid of any reactive group other than the ethylenically unsaturated double bond such as those set forth hereinabove and the discussion of the styrene family monomers and the like. Obviously, these hydroxy ester monomers may be used in combination with the reactive carboxyl group, containing monomers set forth hereinabove in the selected amounts.

Among the amide group-containing monomers which may be used to prepare the polymeric materials of the present invention are acrylamide, methacrylamide, ethacrylamide, isobutoxymethylacrylamide and the like. These polymerizable acrylamides may be used to prepare the polymeric materials of the present invention with any of the carboxyl group-containing monomers and/or hydroxyl group-containing monomers in the selected amounts with any of the polymerizable monomers set forth hereinabove that are devoid of any reactive groups other than the polymerizable ethylenically unsaturated double bond. These polymeric materials, whether they contain the reactive carboxyl groups and/or the reactive alcoholic hydroxyl groups and/or the reactive amide groups will be anionic or non-ionic polymeric materials.

When the acrylic monomers are used in the process of the present invention, one may select the hard monomers such as styrene, methylmethacrylate, substituted styrenes such as those disclosed hereinabove and these monomers may be present in the system to the exclusion of any soft monomers or any of the functional monomers. However, when the hard monomers are used with the functional monomers, namely, those containing carboxyl groups, alcoholic hydroxyl groups or amide groups, the amount of the hard monomer present should not be less than about 85%, by weight, and the functional monomer should be present in an amount not more than 15%, by weight, based on the total weight of the monomers, the hard monomers will be present in the system when used alone with the functional monomers in an amount varying between 95% and 99%, by weight, based on the total weight of the monomers.

The soft monomers are such compounds as methyl acrylate, ethyl acrylate, propyl acrylate, butyl acrylate, and the like. These soft monomers can be used solely in the polymerization system to the exclusion of hard monomers and the functional monomers or the soft monomers can be used in combination with the functional monomers to the exclusion of the hard monomers. When this latter combination is used, the soft monomers will be present in an amount of at least 85% and the functional monomers present in an amount of not more than 15%, by weight, based on the total weight of the soft monomers and functional monomers. It is preferred to use 1% to about 5%, by weight, of the functional monomers in combination with the soft monomers whereupon there would be present in the system of these two monomers at least 95%, by weight of the soft monomers and not more than 99%, by weight, of the soft monomers based on the total weight of the combination of the soft monomers and the functional monomers.

Combinations of all three classes of these acrylic monomers can be used, namely, a combination of the hard monomers, the soft monomers, and the functional monomers. When these three types of monomers are used, the hard monomers and the soft monomers must total at least 85%, by weight, of the total weight of monomers and the functional monomers should be present in an amount not greater than about 15% of the total weight of the monomers. It is preferred to use a combination of about 95 to about 99%, by weight, of the combination of the hard monomers and the soft monomers and between about 5% and 1%, by weight, of the functional monomers.

The amino cross-linking agent used in the process of the present invention is present in the aqueous system in an amount varying between 0.1% and about 5%, by weight, based on the total weight of monomer being polymerized. It is preferred to use the amino compound in amounts varying between 0.5% and about 2%, by weight, based on the total weight of the emulsion monomer solids. These aminoplast cross-linking agents may be simple compounds or they may be partly resinous or predominantly polymeric. In some instances they are mixtures of monomers and the remainder is dimer, trimer, tetramer and higher oligomers. The aminoplast cross-linking agents used in the process of the present invention do not function as cross-linking agents in this particular process but instead they function as a controller of the increase in the particle size of the polymeric or copolymeric material being produced when considered against the size of the same polymeric materials when polymerized in the presence of conventional surfactant but without the benefit of the presence of the cross-linking agent. In other words, these aminoplast materials function more as a particle size increase agent or a particle size increase aide. The aminoplast cross-linking agents used in the present invention, on the other hand, do not function as a surfactant but rather in carrying out the emulsion polymerization process a different surfactant is needed in order to achieve the emulsion polymerization. The aminoplast used in the present invention must be either water-dispersible or water-soluble in the presence of the surfactant in water. The surfactants that are used in the process of the present invention are any of the conventional surfactants, that are used in aqueous emulsion systems, and will be used in conventional amounts. During the course of the emulsion polymerization, the aminoplast undergoes chemical change so that its identity, in the final product, is no longer that of the original aminoplast. Said aminoplasts are known to undergo reactions such as hydrolysis, dimethylolation, and, perhaps, polycondensation reactions.

The added aminoplasts have been shown to produce backbone polymers with much higher molecular weights when compared to the polymers formed without the presence of said aminoplast. In the examples to be set forth hereinbelow various amino compounds are used and they are identified immediately hereinbelow so as to correlate the compound with its numerical identification.

Amino compound #1 is a melamine compound with an average molar composition of melamine/formaldehyde/methanol of 1:5.8:5.1 respectively and it is predominantly monomeric.

Amino compound #2 is a melamine compound with an average molar composition of melamine/formaldehyde/methanol of 1:6:4.4 respectively and is predominantly monomeric.

Amino compound #3 is hexakismethoxymethylmelamine.

Amino compound #4 is a melamine/formaldehyde/methanol reaction product having the mole ratio 1:4.8:3.8 respectively and is predominantly polymeric.

Amino compound #5 is melamine per se, namely, 2,4,6-triamino-1,3,5-triazine.

Amino compound #6 is a melamine/formaldehyde/butanol reaction product having a mole ration 1:5.5:4.5 respectively and is about 50% monomeric, the remainder being dimer, trimer, and tetramer.

Amino compound #7 is a mixed ether of melamine/formaldehyde/butanol/methanol having a mole ratio of 1:5.5:1.8:3.7 respectively and is mainly monomeric.

Amino compound #8 is a melamine/formaldehyde/methanol reaction product having a mole ratio of 1:3:1.8 respectively and is a monomeric material.

Amino compound #9 is a melamine/formaldehyde/butanol reaction product having a mole ratio of 1:4.8:2.2 respectively and is a polymeric material.

Amino compound #10 is a urea/formaldehyde/methanol reaction product having a mole ratio of 1:2.4:1.9 respectively and is mainly a dimeric material.

Amino compound #11 is a glycoluril/formaldehyde reaction product having a mole ratio of 1:2.0 respectively.

We have developed several ways of incorporating these aminoplast cross-linking agents into the vinyl emulsions. The amino compounds are incorporated into the reaction vessel during the emulsion polymerization process and the reaction takes place in an unknown manner so as to become an intimate part of the emulsion polymer. A more detailed description of the general process for carrying out the methods A-E inclusive is set forth in the Examples hereinbelow and will be more fully identified in Table I hereinbelow. These examples are set forth primarily for the purpose of illustration and any specific enumeration of detail contained therein should not be interpreted as a limitation on the case except as indicated in the appended claims. All parts are parts by weight unless otherwise indicated.

EXAMPLE—METHOD A

Into a suitable reaction vessel equipped with a reflux condenser, dropping funnel, nitrogen source, mechanical stirrer and thermometer, the selected amounts of deionized water, surfactant and amino cross-linking agent are introduced and the pH of the system is adjusted to about 9.5-9.8. The selected monomers in the indicated amounts are charged as a blend to the dropping funnel. The aqueous composition is heated to about 100° C. and held at that temperature with constant agitation under an inert atmosphere for about 15 minutes. It is then cooled to 80° C. and the catalyst solution is charged. There is then charged 10% of the monomer blend over a 2 minute period and the remaining monomer blend is charged over a 1½ to 2 hour period in incremental portions. At the end of this addition, the emulsion is held at about 80°-85° C. for about 1-2 hours. After cooling, the finished emulsion may be filtered through felt.

EXAMPLE — METHOD B

Into a suitable reaction vessel equipped with a reflux condenser, 2 dropping funnels, a nitrogen source, a mechanical stirrer and thermometer, the aqueous blend is charged as in Example A and the pH is adjusted to about 9.5–9.8. The monomer blend is charged to 1 dropping funnel and the aqueous catalyst solution to the other. The aqueous dispersion in the reaction vessel is heated to about 100° C. and held at that temperature for about 15 minutes with agitation under the nitrogen gas. The aqueous dispersion is then cooled to 80° C. and simultaneously the monomer blend and the catalyst are added over 1½ - 2 hr. At the end of this addition, the emulsion is held at 78°–82° C. for one half to 1 hour and 85°–99° C. for ½ - 1½ hours before cooling and filtering.

EXAMPLE — METHOD C

Into a suitable reaction vessel as described in Method A there is introduced the deionized water and the surfactant and the pH is adjusted to 9.5–9.8. The monomer blend and the amino resin are charged to the dropping funnel. The aqueous mixture is heated to 100° C. and held at that temperature for 15 minutes with agitation under the nitrogen blanket. The mixture is cooled to 80° C., whereupon the catalyst solution is charged to the reactor followed by the charge of the monomer blend over 1¼ - 2 hours. The temperature is held at about 80° C. for about 1–2 hours.

EXAMPLE — METHOD D

Into a suitable reaction vessel as described in Method A there is charged the deionized water, the surfactant and the amino resin. The pH is approximately 5.5. The monomer mixture is charged to the dropping funnel. The aqueous dispersion in the reaction vessel is heated to about 100° C. and when the mixture becomes clear, due to the hydrolysis of the amino resin, the pH is adjusted to about 9–10 which halts the hydrolysis and preserves the clear solution. The aqueous dispersion is held at about 100° C. under a blanket of nitrogen with constant stirring for about 15 minutes, whereupon the charge is cooled to about 80° C. and the monomer blend is charged simultaneously with the catalyst from two separate dropping funnels over a 1½–2 hour period. At the end of the addition, the emulsion is held at about 78°–82° C. for ½ hour and 85°–99° C. for ½ - 1½ hours before cooling and filtering.

EXAMPLE — METHOD E

Into a suitable reaction vessel as in Method A there is charged the deionized water, the surfactant and the amino cross-linking agent. The pH should be adjusted to approximately 5.5. The monomer mixture is charged to the dropping funnel. The aqueous charge is heated to about 100° C. and as the amino compound hydrolyzes, the mixture changes from cloudy to clear. Very shortly afterwards and quite rapidly the mixture becomes milky white, presumably due to self-condensation of the amino compound. At this point, the pH is adjusted to 9–10 in order to prevent a further reaction of the amino cross-linking agent with itself. The aqueous dispersion is held at 100° C. with constant stirring under a blanket of nitrogen gas for about 15 minutes. The charge is then cooled to 80° C. and simultaneously there is added the monomer blend from one dropping funnel and the catalyst solution from the other. This addition takes 1½ - 2 hours. At the end of the addition, the emulsion is held at 78°–82° C. for ½ hour and 85°–99° C. for ½ - 1½ hour before filtering and cooling.

There is set forth hereinbelow Table I which shows the emulsions that were prepared using the procedures as described in Methods A, B, C, D and E. The monomeric composition selected for these examples was composed of butyl acrylate (BA) methyl methacrylate (MMA), acrylonitrile (AN), and methacrylic acid (MAA). The surfactant chosen was a dialkyl sulfosuccinate at a level of about 2–3 weight percent based on the weight of the monomers and as the catalyst the ammonium persulfate was used.

TABLE I

| Ex. No. | Monomer Composition BA | MMA | AN | MAA | Amino,% | Process | Solids, % | (Based on Monomers) Approx. Coagulum Level | viscosity,cps | Particle Size | Skinning Tendency |
|---|---|---|---|---|---|---|---|---|---|---|---|
| 1 | 45 | 31 | 21 | 3 | — 0 | A | 45 | <½% | 175 | <1μ | Yes |
| 2 | 45 | 31 | 21 | 3 | — 0 | A | 51.8 | <½% | 1,620 | <1μ | Yes |
| 3 | 45 | 31 | 21 | 3 | No. 1, 2 | A | 52 | <½% | 50 | <1μ | No |
| 4 | 45 | 31 | 21 | 3 | No. 1, 1 | B | 54 | <½% | 270 | <1μ | No |
| 5 | 45 | 31 | 21 | 3 | No. 1, 2 | D | 45 | ~½% | 20 | <1μ | No |
| 6 | 45 | 31 | 21 | 3 | No. 1, 2 | E | 44–45 | <½% | 20 | <1μ | No |
| 7 | 44 | 29 | 19 | 3 | No. 1, 2 | C | 43 | ~3 | 20 | <1μ | No |
| 8 | 45 | 31 | 21 | 3 | No. 1, 2 | A | 56 | <½% | 148 | <1μ | No |
| 9 | 45 | 31 | 21 | 3 | No. 1, 1 | A | 58 | <½% | 1,025 | <1μ | No |
| 10 | 45 | 31 | 21 | 3 | No. 2, 2 | A | 45 | <½% | 5 | <1μ | No |
| 11 | 45 | 31 | 21 | 3 | No. 2, 3 | A | 45 | <½% | — | <1μ | No |
| 12 | 45 | 30 | 20 | 5 | No. 2, 3 | A | 45 | <½% | 20 | <1μ | No |
| 13 | 45 | 31 | 21 | 3 | No. 3, 2 | A | 45 | >½% | 15 | <1μ | Yes |
| 14 | 44 | 30 | 20 | 3 | No. 4, 2 | C | 45 | ~4–5% | 20 | <1μ | No |
| 15 | 45 | 31 | 21 | 3 | No. 6, 2 | C | 45 | <1% | 40 | <1μ | Yes |
| 16 | 45 | 30 | 20 | 3 | No. 7, 2 | C | 45 | <2% | — | <1μ | No |
| 17 | 45 | 30 | 20 | 3 | No. 8, 2 | A | 45 | ~2% | — | <1μ | No |
| 18 | 45 | 31 | 21 | 3 | No. 9, 2 | A | 45 | ~15–20% | 30 | <1μ | No |
| 19 | 45 | 31 | 21 | 3 | No. 5, 2 | A | 45 | 8–11% | 20 | <1μ | No |
| 20 | 45 | 31 | 21 | 3 | No. 6, 2 | A | 45 | <½% | 80 | <1μ | No |
| 21 | 45 | 31 | 21 | 3 | No. 10, 2 | A | 45 | <½% | 25 | <1μ | No |
| 22 | 45 | 31 | 21 | 3 | No. 11, 2 | A | 45 | <½% | 30 | <1μ | No |

A selected group of the vinyl emulsion polymers set forth in Table I were subjected to aging in a 55° C. oven for one week in order to obtain viscosity data on these emulsion systems. The results of the tests are set forth in Table II hereinbelow.

TABLE II

| | | | | Viscosity of Neutralized Emulsion | | |
|---|---|---|---|---|---|---|
| Example No. | % Solids | Viscosity Neat Emulsion | Viscosity Neat Emulsion After Aging[2] | % N | | Viscosity Neutralized Emulsion After Aging[2] |
| 1 | 45 | 175 | 75 | 50 | 900 | 115 |
| 1 | 45 | 260 | 125 | 100 | 1,100 | 50 |
| 3 | 47 | 50 | 60 | 50 | 100 | 80 |
| 7 | 45 | 20 | 22 | 50 | 25 | 20 |
| 7 | 45 | | | 100 | 370 | Gelled |
| 8 | 56 | 148 | 30 | 50 | 525 | 300 |
| 9 | 58 | 1,025 | 1,020 | 50 | 2,400 | Partially Gelled |
| 10 | 45 | 5 | 20 | 50 | 20 | 25 |
| 20 | 45 | 80 | 45 | 50 | 125 | 80 |
| 21 | 45 | 25 | 30 | 50 | 35 | 65 |
| 22 | 45 | 30 | 30 | 50 | 50 | 45 |

[1]Measured on a Brookfield Viscometer (Model No. RVF-7) using No. 3 spindle at 20 rpm.
[2]Aging was done in a 55° C. for one week.

As shown in Tables I and II, the amino cross-linking agent modified emulsions (Examples 3-23) when compared to the non-modified emulsions (1 and 2) show the following:

The Examples 3, 7, 8, 9, 10, 20, 21 and 22 displayed lower viscosity at the same solids level and improved viscosity control upon the neutralization. These same examples showed improved viscosity stability upon aging at elevated temperatures when compared with the Examples 1 and 2, the controls. The examples illustrative of the present invention also showed lowered skinning tendency.

A standardized procedure was established for the preparation of various enamel formulations using the vinyl emulsion polymers of the present invention with or without the amino modification. There is prepared 34 parts, by weight, of a pigment dispersion containing 24.2 parts of rutile titanium dioxide, 7.2 parts of water, 0.6 part of dimethylamino ethanol, 1.5 parts of a 50% aqueous dispersion of a styrene-acrylic polymer, used as a dispersing agent for the pigment, and said polymer being composed of 55%, by weight, of butyl acrylate, 30% of styrene and 15% of acrylic acid. This dispersing agent polymer had an acid number of 100-110. There is also added to the pigment dispersion 0.5 part of a monomeric methylated melamine-formaldehyde resin having a mole ratio of 1:5.8:5.0. This methylated melamine-formaldehyde resin is used as an antifoaming agent. This pigment dispersion is added to the vinyl emulsion polymer (at any solids in an amount sufficient to supply 30 parts by weight of vinyl resin solids). To this blend is added 2.6 parts of a monomeric methylated melamine-formaldehyde resin having a mole ratio of 1:5.8:5.0 respectively and optionally 0.2 part of a catalyst mixture consisting of 0.1 part of paratoluene sulfonic acid, 0.06 part of dimethylamino ethanol and 0.04 part of water. This mixture is stirred for at least 15 minutes. The pH of this enamel formulation is 7.5-7.9 and the application solids can range from about 55 to 64% solids depending on the percentage of solids in the emulsion. These enamels are drawn down on aluminum panels (0.025inch thick) and are baked in a forced air oven at a temperature of 500° F. for a period of 1 minute. When films are drawn down on steel panels (24 gauge), the baking time of 90 seconds at 500° F. is necessary to achieve cure. The presence of the amino compounds in the emulsion during the polymerization step lowers the viscosity of the emulsion at higher solids and after neutralization allows for the formulation of stable paints with higher application solids. Thus, when an emulsion (Example 2) without the amino modification is prepared at 50% solids, the application solids of its enamel is at about 59-61% as described above. The shelf-life of this paint is typically 48-72 hours. However, an emulsion with amino modification prepared at 53-55% solids (such as Example 3) produces an enamel at 62-64% solids, and had excellent long term stability. The amino modified emulsions show improved application characteristics relative to the unmodified emulsions and one can obtain higher dry film thickness without mudcracking or blistering when no holdout is allowed, i.e., blister and mud crack resistance, and they also display improved flow properties as shown in Table III set forth hereinbelow.

TABLE III

Unmodified Versus Amino Modified Emulsion Enamels
Film Properties and Application Characteristics

| Example No. | Amino Content | Enamel Solids | Obtainable Film Thickness, mls. | Color | Gloss, 60/20 | Knoop Hardness | Reverse Impact | T-Bend | Ease of Pigment Redispersability |
|---|---|---|---|---|---|---|---|---|---|
| 1 | 0 | 55.9 | 0.55-0.65 | 89 | 83/59 | 10.7 | 50-60 | $T_0$ | + |
| 3 | 2 | 61.7 | >1.7 | 88 | 89/64 | 11.7 | <10 | $T_2$ | + |
| 5 | 2 | 56.5 | <1.2 | 87 | 78/49 | 11.6 | 30 | $T_2$ | + |
| 6 | 2 | 56.5 | <1.3 | 85 | 82/55 | 11.5 | 40 | $T_2$ | — |
| 10 | 2 | 55.9 | 1.0 | | 72/38 | 11.5 | | | — |
| 13 | 2 | 55.9 | >1.3 | 87 | 81/50 | 11.7 | | | — |
| 16 | 2 | 55.9 | >0.8 | | 75/40 | 10.7 | 60 | | + |
| 19 | 2 | 55.9 | 0.65 | 85 | 72/38 | 11.5 | | | + |
| 20 | 2 | 55.9 | >0.8 | | 83/59 | 9.3 | | | + |
| 21 | 2 | 55.9 | 0.65 | 86 | 78/43 | 12.1 | | | + |
| 22 | 2 | 55.9 | 0.65 | 87 | 81/50 | 11.7 | | | + |

+ = Easy to disperse.
— = Difficult to disperse.

If the amino compound used in the process of the present invention is water-soluble, it can readily be blended and dissolved in the aqueous medium. On the other hand, if the amino compound is water-insoluble, certain surfactants used in the emulsion polymerization can be utilized as a dispersing agent for the amino compound.

The amino compound used in the polymerization process of the present invention can be derived from melamine, benzoguanamine, urea, glycoluril and their formaldehyde reaction products with or without alkylation. When these methylolated reaction products are alkylated, they are generally alkylated with a C1 to C4 alcohol.

Although the process of the present invention is directed to the polymerization of one or more polymerizable vinyl monomers and preferably one or more normally liquid polymerizable vinyl monomers, one can use with such normally liquid vinyl monomers other polymerizable monomers which are normally gaseous such as ethylene, propylene or butadiene in which event, for instance, the butadiene can be dissolved in styrene and an emulsion copolymer of the same can be prepared, practicing the process of the present invention.

The change in application and handling characteristics of a vinyl emulsion polymer prepared in the presence of a small amount of amino compound is significant. Fine particle size acrylic emulsions which were extremely viscous if they were prepared at a non-volatile content greater than 45% gave low viscosity emulsions at a non-volatile content of 55–60% if prepared in the presence of about 1% of hexakismethoxymethylmelamine. Not only is it possible to increase the solids content but other characteristics of the emulsion polymer were enhanced as well. For instance, high solids emulsions normally suffer under an excessive tendency to form skin during storage. The emulsions of the present invention showed significantly reduced tendency to skin during storage and even in thick layers dried uniformly. In baking applications, the flash-off time is often a problem. With conventional emulsions, there is required excessive time to release water. In a continuous application of paint in a conveyorized operation, only limited flash-off time is available. Conventional emulsions might have to be applied in two or even three coats in order to achieve a blister-free film. On the other hand, the modification of the emulsion polymer with an amino compound permits high film thickness and blister-free films.

Emulsion polymers, containing functional groups such as carboxyl groups, have a significant tendency to change viscosity if neutralized to a workable pH. This increases in viscosity during neutralization is normally reversed during aging of the compounded emulsion. The modifications of the emulsion with amino compound during the emulsification process greatly reduces or eliminates this viscosity problem.

As a consequence, the present invention permits the production of emulsions which show the following advantages: (1) lower viscosity at the same solids, (2) viscosity stability upon aging at elevated temperatures, (3) viscosity stability upon neutralization (i.e., lowered swelling tendency) and (4) improved application characteristics such as blister and mudcrack resistance, higher obtainable dry film thicknesses, greater flow properties when compared to emulsions prepared without the amino modification.

The surfactants or emulsifying agents that can be used in the process of the present invention are any of the conventional surfactants, that are used in aqueous emulsion systems, and will be used in the conventional amounts. In the examples, there was used the disodium salt of the half ester of sulfosuccinic acid derived from a $C_{10}$ to $C_{12}$ straight chain ethoxylated alcohol mixture. Additionally, one could use the sodium or amine salts or ammonium salts of alkyl-aryl half esters of sulfosuccinic acid or the sodium or amine salts or ammonium salts of fatty alcohol ether sulfate esters. Additionally, one can use the sodium, amine or ammonium salts of the mono and diesters of phosphoric acid derived from polyethoxyethanol, alkylphenoxypoly (ethyleneoxy)ethanol. Additionally, one can use the nonionic surfactants derived from polyethylenoxy and polypropyleneoxy alcohols. Still further, one can use the sodium, amine or ammonium salts of linear alkyl sulfonic acids. Still further, one can use the tetrasodium N-(1,2-dicarboxyethyl)-N-octadecyl sulfosuccinate. The amounts of the surfactant can vary between about 0.1% and 10%, by weight, based on the total weight of the monomers to be polymerized. It is preferred to use between about 1% and 4%, by weight, same basis.

Among the catalysts which may be used in the process of the present invention are ammonium persulfate alone or in conjunction with organic peroxides such as t-butylperbenzoate. The organic peroxides can be used alone such as benzoyl peroxide, the tertiary-butyl hydroperoxide, the ditertiarybutyl hydroperoxide, cumene hydroperoxide and the like. Additionally, one can make use of such initiators as the 2,2′-azobisisobutyronitrile and other azobis type initiators. The amount of the catalyst used is conventional and can vary between about 0.1% to about 2%, by weight, based on the total weight of the monomers to be polymerized. It is preferred to use between 0.2% and about 1%, by weight, same basis. Redox catalyst systems such as ammonium persulfate/sodium bisulfite systems and the like may be used.

We claim:

1. A process for preparing an aqueous emulsion of a vinyl polymer comprising polymerizing at least one polymerizable vinyl monomer in an aqueous emulsion system in the presence of an emulsifying agent, a polymerization catalyst and from about 0.1% to about 5%, by weight, based on the weight of the monomer being polymerized, of a non-copolymerizable aminoplast resin which is water-soluble or water-dispersible in the presence of the emulsifying agent and which has been prepared from an amino compound, formaldehyde and a $C_1$–$C_4$ monohydric alcohol.

2. A process according to claim 1 in which a plurality of polymerizable vinyl monomers is used.

3. A process according to claim 2 in which at least one of the vinyl monomers is an acrylic monomer.

4. A process according to claim 2 in which one of the vinyl monomers is vinyl acetate.

5. A process according to claim 3 in which the acrylic monomer is a hard monomer.

6. A process according to claim 3 in which the acrylic monomer is a functional monomer and is present in an amount up to 15%, by weight, based on the total weight of vinyl monomers present.

7. A process according to claim 3 in which the acrylic monomer is a soft monomer.

8. A process according to claim 3 in which there is present (A) up to 85%, by weight, of a hard monomer (B) up to 85%, by weight, of a soft monomer and (C) up to 15%, by weight, of a functional monomer, wherein the total percentages of (A), (B) and (C), by weight, total 100%.

9. A process according to claim 3 in which the monomers are butyl acrylate, methyl methacrylate, acrylonitrile and methacrylic acid.

10. An aqueous emulsion of a vinyl polymer, said emulsion being produced by polymerizing at least one polymerizable vinyl monomer in an aqueous emulsion system in the presence of from about 0.1% to about 5%, by weight, based on the weight of monomer being polymerized of a non-copolymerizable aminoplast resin which is water-soluble or water-dispersible in the presence of the emulsifying agent and which has been prepared from an amino compound, formaldehyde and a $C_1$–$C_4$ monohydric alcohol.

11. The process of claim 1 wherein said amino compound is melamine.

12. The process of claim 9 wherein the aminoplast resin has been prepared from melamine, formaldehyde and methanol.

13. The emulsion of claim 10 wherein butyl acrylate, methyl methacrylate, acrylonitrile and methacrylic acid are utilized as vinyl monomers.

14. The emulsion of claim 12 in which the aminoplast resin has been prepared from melamine, formaldehyde and methanol.

* * * * *